US010328850B2

(12) United States Patent
Yamada et al.

(10) Patent No.: US 10,328,850 B2
(45) Date of Patent: Jun. 25, 2019

(54) SKIN MATERIAL FOR VEHICLE INTERIOR

(71) Applicants: TOYOTA BOSHOKU KABUSHIKI KAISHA, Aichi-ken (JP); DAIKI CO., LTD., Fukui-ken (JP)

(72) Inventors: Takamasa Yamada, Aichi-ken (JP); Hirohiko Sakai, Kyoto-fu (JP); Takayoshi Yamamoto, Fukui-ken (JP)

(73) Assignees: TOYOTA BOSHOKU KABUSHIKI KAISHA, Aichi-Ken (JP); DAIKI CO., LTD., Fukui-Ken (JP)

( * ) Notice: Subject to any disclaimer, the term of this patent is extended or adjusted under 35 U.S.C. 154(b) by 0 days.

(21) Appl. No.: 15/976,248

(22) Filed: May 10, 2018

(65) Prior Publication Data

US 2018/0339649 A1 Nov. 29, 2018

(30) Foreign Application Priority Data

May 26, 2017 (JP) .................. 2017-104694

(51) Int. Cl.
*B60Q 3/54* (2017.01)
*B60Q 3/64* (2017.01)
(Continued)

(52) U.S. Cl.
CPC .............. *B60Q 3/54* (2017.02); *B60Q 3/64* (2017.02); *B60R 13/02* (2013.01); *D02G 3/441* (2013.01);
(Continued)

(58) Field of Classification Search
CPC . B60Q 3/54; B60Q 3/242; B60Q 3/20; B60Q 3/745; B60Q 3/292; B60Q 3/62;
(Continued)

(56) References Cited

U.S. PATENT DOCUMENTS

| 3,508,589 A | 4/1970 | Derick et al. |
| 5,524,679 A | 6/1996 | Wiener |
| (Continued) | | |

FOREIGN PATENT DOCUMENTS

| DE | 3525838 | 1/1987 |
| JP | 8-54523 | 2/1996 |
| (Continued) | | |

OTHER PUBLICATIONS

Official Communication issued in European Patent Office (EPO) Patent Application No. 18173574.7, dated Aug. 8, 2018.
(Continued)

*Primary Examiner* — Joseph L Williams
*Assistant Examiner* — Jose M Diaz
(74) *Attorney, Agent, or Firm* — Grenblum & Bernstein, P.L.C.

(57) ABSTRACT

Provided is a skin material which forms a vehicle interior design surface, functions as lighting, and suppresses the fray of side emission type optical fibers.
The skin material includes a woven fabric woven by using synthetic resin fibers, side emission type optical fibers, and heat fusible fibers as warps or wefts. A ratio ($d_S/d_f$) of fineness ($d_S$) of the synthetic resin fibers to fineness ($d_f$) of the side emission type optical fibers is from 1.5 to 7.0. The synthetic resin fibers and the side emission type optical fibers adjacent to the synthetic resin fibers are bonded in respective longitudinal directions thereof by the heat fusible fibers. When a plurality of the side emission type optical fibers are woven between the adjacent synthetic resin fibers, the adjacent side emission type optical fibers are bonded to each other in the longitudinal direction by the heat fusible fibers.

18 Claims, 5 Drawing Sheets

(51) Int. Cl.
*D02G 3/44* (2006.01)
*D03D 1/00* (2006.01)
*F21V 8/00* (2006.01)
*B60R 13/02* (2006.01)
*D03D 15/00* (2006.01)

(52) U.S. Cl.
CPC ........... *D03D 1/0088* (2013.01); *D03D 15/00* (2013.01); *G02B 6/001* (2013.01); *G02B 6/0005* (2013.01); *B60Q 2500/10* (2013.01); *B60R 2013/0287* (2013.01); *D03D 2700/0144* (2013.01); *D10B 2331/02* (2013.01); *D10B 2331/04* (2013.01); *D10B 2401/041* (2013.01); *D10B 2401/20* (2013.01); *D10B 2505/12* (2013.01); *F21V 2200/15* (2015.01)

(58) Field of Classification Search
CPC .... B60Q 3/64; B60Q 2500/10; D03D 1/0088; D03D 15/00; D03D 2700/0144; D02G 3/441; B60R 13/02; B60R 2013/0287; G02B 6/0005; G02B 6/001; G02B 6/02023; G02B 6/02028; G02B 6/00; G02B 6/003; D10B 2331/02; D10B 2331/04; D10B 2505/12; D10B 2401/041; D10B 2401/20; F21V 2200/15; F21V 2200/00; F21V 2200/10; F21S 41/24; F21S 43/235; F21S 43/50
See application file for complete search history.

(56) References Cited

U.S. PATENT DOCUMENTS

2018/0340684 A1* 11/2018 Yamada ................. D03D 15/00
2018/0347114 A1* 12/2018 Despault .................. D21F 7/12

FOREIGN PATENT DOCUMENTS

JP        2010-267573        11/2010
JP        2016-37688         3/2016

OTHER PUBLICATIONS

U.S. Appl. No. 15/976,268 to Takamasa Yamada et al., filed May 10, 2018.

* cited by examiner

[Fig. 1]
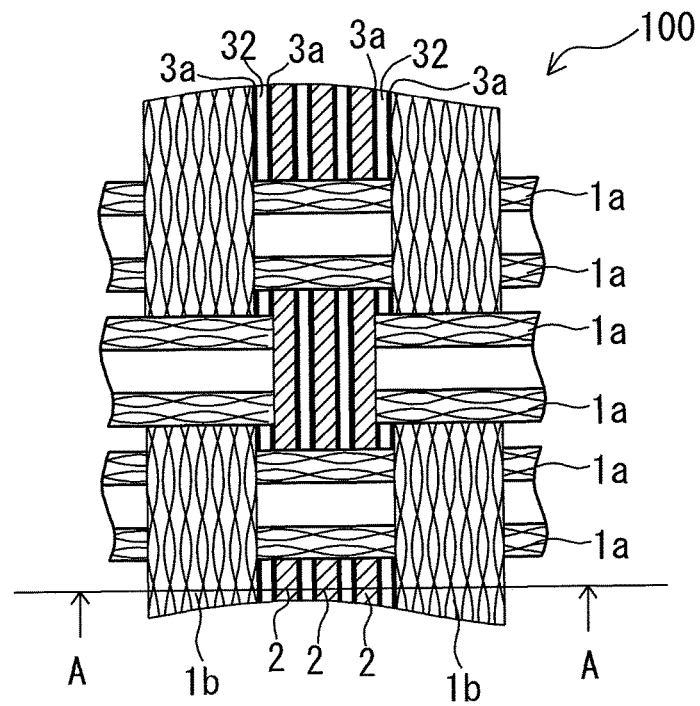
[Fig. 2]
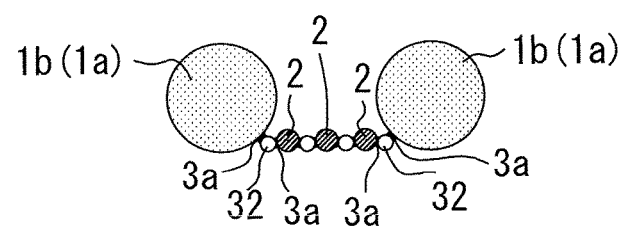
[Fig. 3]
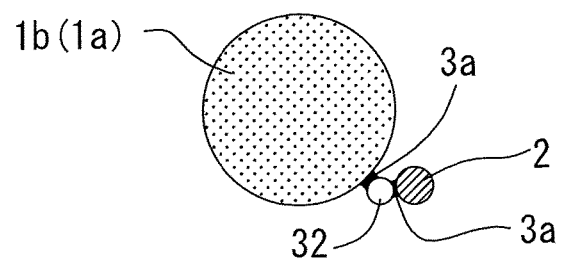

[Fig. 4]
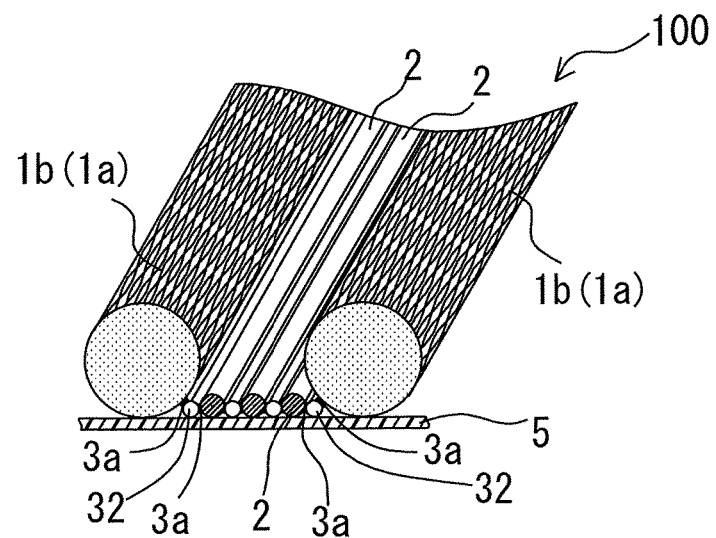
[Fig. 5]
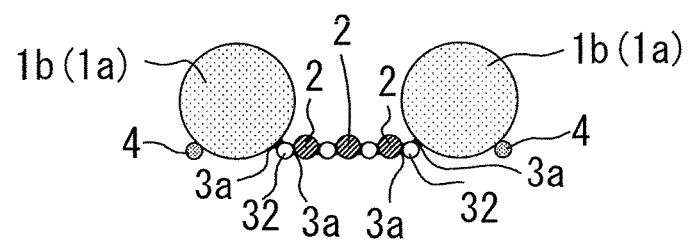

[Fig. 6]
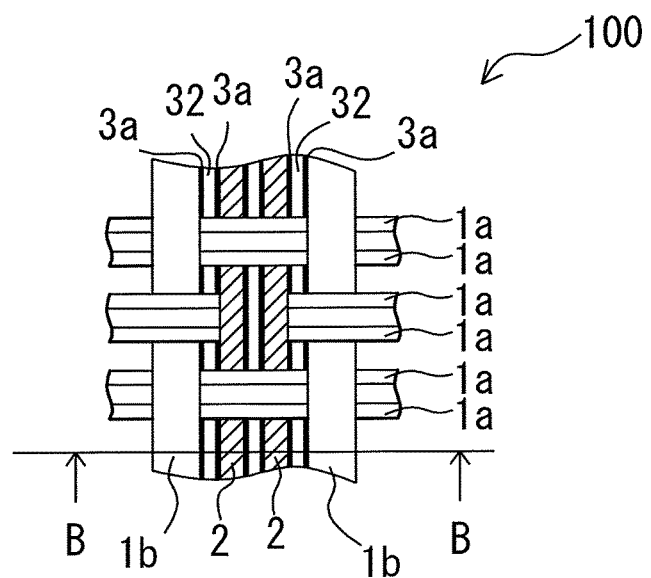
[Fig. 7]
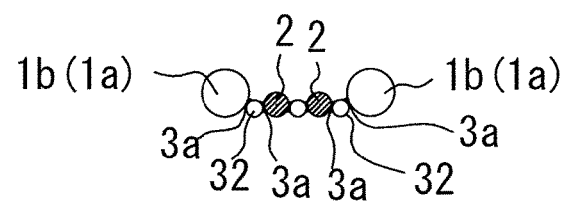

[Fig. 8]
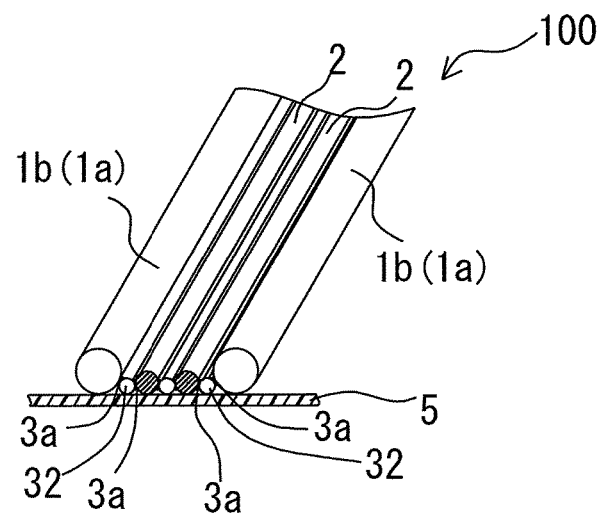
[Fig. 9]
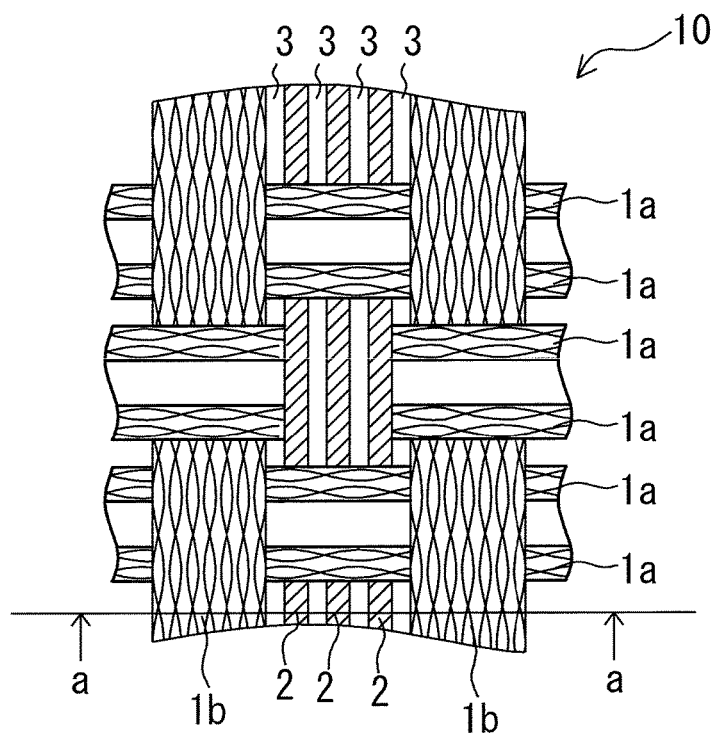

[Fig. 10]
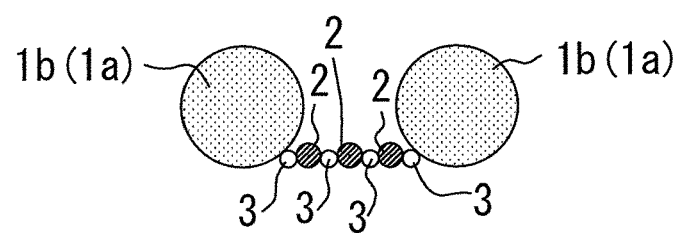
[Fig. 11]
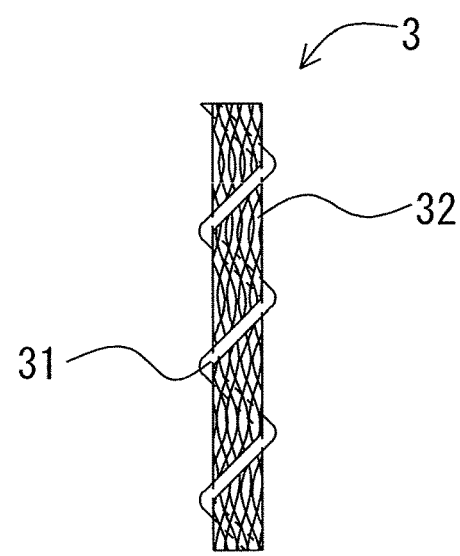

SKIN MATERIAL FOR VEHICLE INTERIOR

CROSS-REFERENCE TO RELATED APPLICATIONS

The present application claims priority under 35 U.S.C. § 119 of Japanese Application No. 2017-104694 filed on May 26, 2017, the disclosure of which is expressly incorporated by reference herein in its entirety.

BACKGROUND

1. Technical Field

The present invention relates to a skin material for vehicle interior. The skin material for vehicle interior is woven by using synthetic resin fibers, side emission type optical fibers, and heat fusible fibers, forms a vehicle interior design surface, functions as lighting, and suppresses the fray of the side emission type optical fibers in an end edge part cut into a predetermined shape and size, wherein the synthetic resin fibers and the side emission type optical fibers adjacent to each other are bonded in longitudinal directions thereof.

2. Related Art

The use of optical fibers is expanding in technical fields of optical communication and the like along with popularization of the Internet and the like. Based on the feature of optical fibers which can guide light made incident from one end to the other end for light transmission, the optical fibers are used also in applications including, for example, various illuminations and displays.

For example, there is known an optical fiber woven fabric obtained by weaving optical fibers and normal yarns as warps or wefts, including a light source delivering light to at least one end part of the optical fibers, and functioning as an illumination device which allows for entrance of light from the light source into the optical fibers, and thus can be utilized as an automobile interior part such as a door trim and a small part (for example, see Japanese Unexamined Patent Application Publication No. 2010-267573). This literature explains that the uneven light emission of the optical fiber woven fabric can be reduced by regularly weaving the optical fibers and the normal yarns in the optical fiber woven fabric to control a woven texture and emission luminance to be in predetermined states.

An optical fiber woven fabric is known (for example, see Japanese Unexamined Patent Application Publication No. 2016-37688). The optical fiber woven fabric is obtained by alternately disposing warps of a plurality of optical fibers and warps composed of ordinary yarns, and crossing and integrating wefts disposed on the front and back surfaces of the optical fibers, warps composed of ordinary yarns, or connecting warps disposed at predetermined intervals. In this optical fiber woven fabric, patterns are formed on the surface of the woven fabric in a region where the degree of exposure of the optical fibers on the surface of the woven fabric is low and a region where degree exposure of the optical fibers is high depending on how the surface of the optical fibers is covered with the warps and wefts composed of normal yarns. A clear emission pattern is expressed by the side light leakage of the optical fibers.

SUMMARY

In the optical fiber woven fabric described in Japanese Unexamined Patent Application Publication No. 2010-267573, the uneven light emission can be reduced by controlling the woven texture and emission luminance to be in predetermined states. However, Japanese Unexamined Patent Application Laid-open No. 2010-267573 does not mention at all that the optical fibers are prevented from excessively appearing on the surface of automobile interior parts, and from being abraded and scratched, and the fineness of the optical fibers and the fineness of ordinary yarns are set to be within an appropriate range therefor.

Conventionally, a skin material for vehicle interior is manufactured by weaving multifilaments which are synthetic resin fibers as warps and wefts. In this case, in addition to abrasion resistance and strength, multifilaments having relatively low fineness, for example, multifilaments of about 167 dtex are often used from the viewpoint of an appearance and the like. Furthermore, when optical fibers are used as warps or wefts, it is preferable to use side emission type optical fibers made of a resin which is easily woven as the optical fibers. The side emission type optical fibers having fineness of 607 dtex and a diameter of about 0.25 mm can be used.

In the case of weaving using the multifilament and the side emission type optical fibers as described above, there is provided a woven texture in which multifilaments having small fineness are woven on both the sides of the side emission type optical fibers, and both the side emission type optical fibers and the multifilaments are bonded to a resinous vehicle interior base. However, in this embodiment, the side emission type optical fibers appear in a large amount on the outermost surface of the skin material, which is disadvantageous to abrasion and scratch.

Therefore, it is possible to form a woven texture in which multifilaments having small fineness appear on the outermost surface. However, in this case, abrasion may cause multifilaments having small fineness to be reduced in diameter or cut. When the skin material is pressed, the multifilaments having small fineness are pushed into the vehicle interior base side, so that it is conceivable that the side emission type optical fibers appear on the outermost surface of the skin material, and are worn and scratched.

Furthermore, when multifilaments having insufficiently large fineness are used and the multifilaments are worn, the side emission type optical fibers appear on the outermost surface of the skin material, which may insufficiently suppress the abrasion and scratch of the side emission type optical fibers. On the other hand, when multifilaments having excessively large fineness are used, the appearance as the skin material changes. When the multifilaments are pressed and deformed, the multifilaments may be shielded from light, so that the appearance may be reduced.

In the optical fiber woven fabric described in Japanese Unexamined Patent Application Publication No. 2016-37688, a clear emission pattern is expressed by the side surface light leakage of the optical fibers depending on how the surface of the optical fibers is covered with the warps and wefts composed of ordinary yarns. However, Japanese Unexamined Patent Application Publication No. 2016-37688 does not mention at all that the fray of the optical fibers in a cut end edge part is suppressed when the optical fiber woven fabric is cut into a predetermined shape and size.

Conventionally, when a woven fabric woven using synthetic resin fibers and the like is cut into a predetermined shape and size, and the fibers are apt to be frayed in the cut end edge part, heat fusion yarns are woven, so that the fray is suppressed. Furthermore, in a woven fabric obtained by weaving optical fibers which are monofilaments, have a substantially circular cross section, and are apt to slide, the optical fibers are particularly apt to be frayed during cutting. In order to suppress the fray, it is conceivable to use heat fusion yarns.

As described above, it is conceivable to use the heat fusion yarns in order to suppress the fray of the optical fibers, but the heat fusion yarns are not used as they are. The heat fusion yarns are usually used as heat fusible fibers obtained twisting the heat fusion yarns and multifilaments and having high fineness. Therefore, for example, when optical fibers as wefts and heat fusible fibers as warps are woven, heat fusible fibers having high fineness must be woven at intervals, which causes the optical fibers and the heat fusible fibers to be brought into contact with each other in dot forms. As a result, the optical fibers cannot be sufficiently fixed, which may cause the optical fibers to be frayed during cutting.

The present invention has been made in view of the above-described circumstances of the prior art, and it is an object of the present invention to provide a skin material for vehicle interior, the skin material for vehicle interior which is woven by using multifilaments or monofilaments as synthetic resin fibers, side emission type optical fibers, and heat fusible fibers, includes a vehicle interior design surface, functions as lighting, and prevents the abrasion and scratch of optical fibers or suppresses at least the abrasion and scratch. It is another object of the present invention to provide a skin material for vehicle interior suppressing the fray of the side emission type optical fibers in an end edge part cut into a predetermined shape and size, wherein the synthetic resin fibers and the side emission type optical fibers adjacent to each other are bonded in longitudinal directions thereof.

The present invention is as follows.

1. A skin material for vehicle interior is bonded to a resinous vehicle interior base, the skin material for vehicle interior including a woven fabric woven by using synthetic resin fibers, side emission type optical fibers, and heat fusible fibers as warps or wefts, wherein:
a ratio ($d_S/d_f$) of fineness ($d_S$) of the synthetic resin fibers to fineness ($d_f$) of the side emission type optical fibers is from 1.5 to 7.0; and
the synthetic resin fibers and the side emission type optical fibers adjacent to the synthetic resin fibers are bonded in respective longitudinal directions thereof by the heat fusible fibers.
2. The skin material for vehicle interior according to the above 1, wherein: the synthetic resin fibers are multifilaments; and a ratio ($d_{S1}/d_f$) of fineness ($d_{S1}$) of the multifilaments to fineness ($d_f$) of the side emission type optical fibers is from 2.0 to 7.0.
3. The skin material for vehicle interior according to the above 1, wherein: the synthetic resin fibers are monofilaments; and a ratio ($d_{S2}/d_f$) of fineness ($d_{S2}$) of the monofilaments to fineness ($d_f$) of the side emission type optical fibers is from 1.5 to 6.0.
4. The skin material for vehicle interior according to any one of claim 1, wherein: a plurality of the side emission type optical fibers are woven between the synthetic resin fibers adjacent to each other; and the side emission type optical fibers adjacent to each other are bonded to each other in the longitudinal direction by the heat fusible fibers.
5. The skin material for vehicle interior according to claim 2, wherein: a plurality of the side emission type optical fibers are woven between the synthetic resin fibers adjacent to each other; and the side emission type optical fibers adjacent to each other are bonded to each other in the longitudinal direction by the heat fusible fibers.
6. The skin material for vehicle interior according to claim 3, wherein: a plurality of the side emission type optical fibers are woven between the synthetic resin fibers adjacent to each other; and the side emission type optical fibers adjacent to each other are bonded to each other in the longitudinal direction by the heat fusible fibers.
7. The skin material for vehicle interior according to claim 1, wherein the heat fusible fibers are obtained by twisting multifilaments and heat fusion yarns having a melting point lower than that of the multifilaments.
8. The skin material for vehicle interior according to claim 2, wherein the heat fusible fibers are obtained by twisting multifilaments and heat fusion yarns having a melting point lower than that of the multifilaments.
9. The skin material for vehicle interior according to claim 3, wherein the heat fusible fibers are obtained by twisting multifilaments and heat fusion yarns having a melting point lower than that of the multifilaments.
10. The skin material for vehicle interior according to claim 1, wherein: a plurality of the side emission type optical fibers are woven between the synthetic resin fibers adjacent to each other; and the side emission type optical fibers adjacent to each other are bonded to each other in the longitudinal direction by the heat fusible fibers, and wherein the heat fusible fibers are obtained by twisting multifilaments and heat fusion yarns having a melting point lower than that of the multifilaments.
11. The skin material for vehicle interior according to claim 1, wherein: the synthetic resin fibers are multifilaments; and a ratio ($d_{S1}/d_f$) of fineness ($d_{S1}$) of the multifilaments to fineness ($d_f$) of the side emission type optical fibers is from 2.0 to 7.0,
wherein: a plurality of the side emission type optical fibers are woven between the synthetic resin fibers adjacent to each other; and the side emission type optical fibers adjacent to each other are bonded to each other in the longitudinal direction by the heat fusible fibers,
and wherein the heat fusible fibers are obtained by twisting multifilaments and heat fusion yarns having a melting point lower than that of the multifilaments.
12. The skin material for vehicle interior according to claim 1, wherein: the synthetic resin fibers are monofilaments; and a ratio ($d_{S2}/d_f$) of fineness ($d_{S2}$) of the monofilaments to fineness ($d_f$) of the side emission type optical fibers is from 1.5 to 6.0, wherein: a plurality of the side emission type optical fibers are woven between the synthetic resin fibers adjacent to each other; and the side emission type optical fibers adjacent to each other are bonded to each other in the longitudinal direction by the heat fusible fibers,
and wherein the heat fusible fibers are obtained by twisting multifilaments and heat fusion yarns having a melting point lower than that of the multifilaments.
13. The skin material for vehicle interior according to any one of claims 7 to 12, wherein the multifilaments twisted with the heat fusion yarns remain as constituent yarns after the bonding.

The skin material for vehicle interior according to the present invention is woven by using synthetic resin fibers, side emission type optical fibers, and heat fusible fibers as warps or wefts. A ratio ($d_S/d_f$) of fineness ($d_S$) of the synthetic resin fibers to fineness ($d_f$) of the side emission type optical fibers is from 1.5 to 7.0. The synthetic resin fibers and the side emission type optical fibers adjacent to the synthetic resin fibers are bonded in respective longitudinal directions thereof by the heat fusible fibers.

As described above, the use of the synthetic resin fibers having fineness within an appropriate range causes the side emission type optical fibers to be positioned inward relative to the synthetic resin fibers without appearing on the outermost surface of the skin material, and prevents the abrasion and scratch of the side emission type optical fibers caused by the contact with an occupant and other articles, or suppresses at least the abrasion and scratch. It is prevented that the fineness of the synthetic resin fibers is excessive to impair the appearance of the skin material, and that light emission from the side emission type optical fibers is shielded to impair the design property of the skin material. Furthermore, the fray of the side emission type optical fibers which are monofilaments, have a substantially circular cross section, and are apt to slide can be sufficiently suppressed when the skin material for vehicle interior is cut into a predetermined shape and size.

When the synthetic resin fibers are multifilaments, and the ratio ($d_{S1}/d_f$) of the fineness ($d_{S1}$) of the multifilaments to the fineness ($d_f$) of the side emission type optical fibers is from 2.0 to 7.0, the fineness of the multifilaments is not excessively small. Even when the multifilaments are abraded, the abrasion and scratch of the side emission type optical fibers are sufficiently suppressed.

Furthermore, when the synthetic resin fibers are monofilaments, and the ratio ($d_{S2}/d_4$) of the fineness ($d_{S2}$) of the monofilaments to the fineness ($d_f$) of the side emission type optical fibers is from 1.5 to 6.0, the abrasion and scratch of the side emission type optical fibers can be sufficiently suppressed even if the fineness of the monofilaments is decreased as compared with the multifilaments.

When a plurality of side emission type optical fibers are woven between the adjacent synthetic resin fibers, and the adjacent side emission type optical fibers are bonded in the respective longitudinal directions thereof by the heat fusible fibers, the fray of the side emission type optical fibers can be sufficiently suppressed when the skin material for vehicle interior is cut although the plurality of side emission type optical fibers are continuously woven between the adjacent synthetic resin fibers.

Furthermore, when the heat fusible fibers are obtained by twisting multifilaments and heat fusion yarns having a melting point lower than that of the multifilaments, the heat fusible fibers have a sufficient strength as fibers to be woven during weaving, and the heat fusible fibers can be reliably and easily woven between the synthetic resin fibers and the side emission type optical fibers and between the adjacent side emission type optical fibers, whereby the fray of the side emission type optical fibers during cutting can be sufficiently suppressed.

When the multifilaments remain as constituent yarns after bonding, heat fusion yarns contained in the heat fusible fibers melt, which causes no decrease in the strength and the like of the skin material for vehicle interior even after the synthetic resin fibers and the side emission type optical fibers are bonded.

BRIEF DESCRIPTION OF DRAWINGS

FIG. 1 is a schematic plan view of a part of a skin material for vehicle interior according to the present invention using multifilaments.

FIG. 2 is a schematic cross-sectional view showing an A-A cross section of the skin material for vehicle interior in FIG. 1.

FIG. 3 is a schematic cross-sectional view showing an enlarged part in FIG. 2.

FIG. 4 is a schematic perspective view showing an aspect in which the skin material for vehicle interior in FIG. 1 is bonded to a vehicle interior base.

FIG. 5 is a schematic cross-sectional view showing an embodiment in which back fixing yarns are woven in a side part of multifilaments of the skin material for vehicle interior in FIG. 2.

FIG. 6 is a schematic plan view of a part of a skin material for vehicle interior according to the present invention using monofilaments.

FIG. 7 is a schematic cross-sectional view showing a B-B cross section of the skin material for vehicle interior in FIG. 6.

FIG. 8 is a schematic perspective view showing an embodiment in which the skin material for vehicle interior in FIG. 6 is bonded to a vehicle interior base.

FIG. 9 is a schematic plan view of a woven fabric used for manufacturing a skin material for vehicle interior according to the present invention using multifilaments.

FIG. 10 is a schematic cross-sectional view showing an a-a cross section of the woven fabric in FIG. 9.

FIG. 11 is a schematic front view of an example of heat fusible fibers.

DETAILED DESCRIPTION

Hereinafter, the present invention will be described in detail with reference to the drawings.

The particulars shown herein are by way of example and for purposes of illustrative discussion of embodiments of the present invention only, and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description is taken with the drawings, making apparent to those skilled in the art how some forms of the present invention may be embodied in practice.

A skin material for vehicle interior 100 of the present invention is bonded to a resinous vehicle interior base 5 (see FIGS. 4 and 8). The skin material for vehicle interior 100 includes a woven fabric 10 woven by using synthetic resin fibers 1b and 1a, side emission type optical fibers 2, and heat fusible fibers 3 (see FIG. 9 and FIG. 10 showing an a-a cross section in FIG. 9) as warps or wefts. A ratio ($d_S/d_f$) of fineness ($d_S$) of the synthetic resin fibers 1b and 1a to fineness ($d_f$) of the side emission type optical fibers 3 is from 1.5 to 7.0, and the synthetic resin fibers 1b and 1a and the side emission type optical fibers 2 adjacent to the synthetic resin fibers 1b and 1a are bonded by the fusible fibers 3 in the respective longitudinal directions (see bonded part 3a in FIGS. 1 to 8).

The woven fabric 10 is woven by using the synthetic resin fibers 1b and 1a, the side emission type optical fibers 2, and the heat fusible fibers 3 as warps or wefts. The heat fusible fibers 3 are woven between the synthetic resin fibers 1b and 1a and the side emission type optical fibers 2 adjacent to the synthetic resin fibers 1b and 1a. Therefore, when the side emission type optical fibers 2 are woven as wefts, the heat fusible fibers 3 are also woven as wefts, and the synthetic resin fibers adjacent to the side emission type optical fibers 2 are also woven as wefts 1b (see FIG. 9). On the other hand, when the side emission type optical fibers 2 are woven as warps, the heat fusible fibers 3 are also woven as warps, and the synthetic resin fibers adjacent to the side emission type optical fibers 2 are also woven as warps 1a.

Whether the side emission type optical fibers 2 and the heat fusible fibers 3 are woven as warps or wefts is not particularly limited in the skin material for vehicle interior 100, and can be appropriately set depending on the types of the woven texture, loom used, and the like. Furthermore, the loom used for weaving is not particularly limited, and examples thereof include a rapier loom (Models "G6500, R9500" manufactured by Itema Weaving Ltd. (Italy)), a jacquard loom (Models "CX880, DX110, LX1602, SXB" manufactured by STAUBLI (France)), and a dobby loom (Model "UVIVAL500" manufactured by STAUBLI (France)).

The ratio ($d_S/d_f$) of the fineness ($d_S$) of the synthetic resin fibers 1a and 1b to the fineness ($d_f$) of the side emission type optical fibers 2 may be from 1.5 to 7.0, but the ratio ($d_S/d_f$) is preferably set to be within a more appropriate range depending on whether the synthetic resin fibers 1a and 1b are multifilaments (see FIG. 1 and the like) or monofilaments (see FIG. 6 and the like). More specifically, when the synthetic resin fibers 1a and 1b are the multifilaments, the ratio ($d_S/d_f$) is preferably set to be within a larger numerical range within the above numerical range. On the other hand, when the synthetic resin fibers are the monofilaments, the ratio ($d_S/d_f$) is preferably set to be within a smaller numerical range within the above numerical range.

For example, as shown in FIG. 1, when the multifilaments are used as the synthetic resin fibers 1a and 1b, the ratio ($d_{S1}/d_f$) of the fineness ($d_{S1}$) of the multifilaments to the fineness ($d_f$) of the side emission type optical fibers 2 is preferably from 2.0 to 7.0, more preferably from 3.0 to 7.0, and particularly preferably from 4.5 to 7.0. Thus, when the synthetic resin fibers 1a and 1b are the multifilaments, abrasion caused by the contact of the multifilaments with an occupant and other articles, and deformation caused by pressing are apt to occur as compared with the case of the monofilaments, so that fibers having relatively large fineness within an appropriate fineness range are preferably used.

Furthermore, the fineness of the multifilaments is not particularly limited, and in order to prevent the side emission type optical fibers 2 from appearing on the vehicle interior outermost surface of the skin material for vehicle interior 100, and being abraded and scratched, the fineness is preferably from 1000 to 4000 dtex, particularly preferably from 2000 to 4000 dtex, and further particularly preferably from 2500 to 4000 dtex.

On the other hand, as shown in FIG. 6, when the monofilaments are used as the synthetic resin fibers 1a and 1b, the ratio ($d_{S2}/d_f$) of the fineness ($d_{S2}$) of the monofilaments to the fineness ($d_f$) of the side emission type optical fibers 2 is preferably from 1.5 to 6.0, more preferably from 1.5 to 4.0, and particularly preferably from 1.5 to 3.5. Thus, when the synthetic resin fibers 1a and 1b are the monofilaments, the abrasion of the monofilaments caused by the contact with an occupant and other articles, and the deformation of the monofilaments caused by pressing are less likely to occur as compared with the case of the multifilaments, so that fibers having relatively small fineness within an appropriate fineness range are preferably used.

The fineness of the monofilaments is not particularly limited, and in order to prevent the side emission type optical fibers 2 from appearing on the vehicle interior outermost surface of the skin material for vehicle interior 100, and being abraded and scratched, the fineness is preferably from 1000 to 3500 dtex, particularly preferably from 1000 to 3000 dtex, and further particularly preferably from 1000 to 2000 dtex.

The number of the side emission type optical fibers 2 continuously woven between the synthetic resin fibers 1a and 1b is not particularly limited, and it can be set to 1 to 5 from the viewpoints of the design property of the skin material for vehicle interior 100 as an interior material, the form and strength of the skin material for vehicle interior 100 as a woven fabric, and the like. Furthermore, when the synthetic resin fibers 1a and 1b are the multifilaments (see FIGS. 1 and 2), the number of the side emission type optical fibers 2 continuously woven can be set to from 2 to 5, and is preferably from 3 to 4.

On the other hand, the synthetic resin fibers 1a and 1b are the monofilaments (see FIGS. 6 and 7), which make it possible to reflect light from the side emission type optical fibers 2 utilizing its gloss to ensure sufficient luminance. Therefore, the number of the side emission type optical fibers 2 continuously woven can be reduced as compared with the case where the synthetic resin fibers 1a and 1b are the multifilaments. Specifically, the number of the side emission type optical fibers 2 continuously woven may be from 1 to 3, and is preferably from 2 to 3. When the synthetic resin fibers 1a and 1b are the monofilaments, the skin material for vehicle interior 100 having an excellent design property and a good appearance can be provided even if the number of the side emission type optical fibers 2 is 2 or 1.

With regard to the heat fusible fibers 3, at least a part of the heat fusible fibers 3 is only needed to melt at a predetermined temperature to bond the synthetic resin fibers 1b and 1a, the side emission type optical fibers 2 adjacent thereto, and the side emission type optical fibers 2 when the side emission type optical fibers 2 are woven adjacent to each other in the respective longitudinal directions, and the material and the like thereof is not particularly limited. A temperature at which at least a part of the heat fusible fibers 3 melts is also not particularly limited. However, as long as the heat fusible fibers 3 melt in any of the steps of manufacturing the skin material for vehicle interior 100, and the synthetic resin fibers 1b and 1a, the adjacent side emission type optical fibers 2, and the adjacent side emission type optical fibers 2 can be bonded, it is unnecessary to separately provide a step for heat fusion, which is preferable.

As described above, the material and melting temperature of the heat fusible fibers 3 are not particularly limited. However, in order to melt in the step of using the woven fabric 10 as the skin material for vehicle interior 100 and act as the heat fusible fibers 3, the heat fusible fibers 3 preferably melt at a relatively low temperature, for example from 70 to 100° C., and particularly from 70 to 90° C. Examples of the heat fusible fibers 3 include amorphous copolymerized polyester fibers, polyamide fibers, and polyacrylic fibers.

Furthermore, the heat fusible fibers 3 are not usually used only as heat fusion yarns 31, but used as composite fibers obtained by twisting multifilaments 32 made of synthetic resin fibers which do not melt when the heat fusion yarns 31 melt, and the heat fusion yarns 31 (see FIG. 11). As the multifilaments 32, multifilaments made of the same material as that of the synthetic resin fibers 1b and 1a and having small fineness can be used. Such composite fibers make it possible to provide a sufficient strength and the like and easily weave the composite fibers when the woven fabric 10 is woven. Furthermore, even after melting and bonding, the multifilaments 32 remain as constituent yarns of the skin material for vehicle interior 100 as they are, whereby the reduction in the strength and the like of the skin material for vehicle interior 100 is suppressed.

The material of the synthetic resin fibers 1a and 1b is not particularly limited, and fibers made of various synthetic resins can be used. Examples of the synthetic resin include polyamide-based resins such as nylon 6 and nylon 66; polyester-based resins such as polyethylene terephthalate, polybutylene terephthalate and polytrimethylene terephthalate; polyacryl-based resins; and polyolefin-based resins such as polypropylene. As the synthetic resins, polyamide-based resins and polyester-based resins are particularly preferred.

Furthermore, the optical fibers are normally composed of a core layer and a clad layer, and have a structure such that the outer periphery of the core layer is covered with the clad layer. Then, depending on the material, refractive index, reflectance, and the like of each of the core layer and the clad layer, side emission type optical fibers 2 can be obtained, which appropriately leak light from the side surface to emit the light. Furthermore, each of the core layer and the clad layer may be a single layer or have a stacked structure of a plurality of layers. Examples of the optical fibers include various optical fibers such as optical fibers made of a resin and quartz-based optical fibers. The side emission type optical fibers 2 used in the present invention are woven into the woven fabric, and thus are flexible, have excellent bending impact and the like, and can be easily woven.

Furthermore, the diameter of the side emission type optical fibers 2 such as the existing optical fibers made of a resin is from about 0.1 to 10 mm, but from the viewpoint of easiness of weaving, reduction of uneven emission, or versatility, there are used side emission type optical fibers 2 having a diameter of preferably from 0.15 to 1.5 mm, particularly preferably from 0.15 to 1.0 mm, and further particularly preferably from 0.15 to 0.4 min. Furthermore, the fineness of the side emission type optical fibers 2 made of a resin depends on the types of resins constituting the core layer and the clad layer. For example, as described above, when the diameter is 0.25 mm, the side emission type optical fibers 2 have fineness of 607 dtex. A preferable fineness range is determined by a preferable fineness ratio of the fineness of each of the multifilaments and the fineness of the monofilaments to the fineness of the side emission type optical fibers.

As the core layer of the optical fibers made of a resin, there are preferably used resins having excellent transparency: for example, acrylic resins such as polymethyl methacrylate, polyethyl methacrylate and polyethyl acrylate; polycarbonate resins; polystyrene resins; and polyolefin-based resins. Furthermore, as the clad layer, there are preferably used resins having excellent transparency and a refractive index smaller than that of the core layer: for example, vinylidene fluoride resins, vinylidene fluoride-tetrafluoroethylene copolymer resins, polychlorotrifluoro-ethylene resins and trifluoroisopropyl methacrylate resins.

Furthermore, in order to cause the side emission type optical fibers 2 woven into the skin material for vehicle interior 100 to emit light, the tip parts of the plurality of side emission type optical fibers 2 are bundled, and the light source is disposed at a position facing the end surfaces thereof. The light source is not particularly limited, but an LED is usually used. Light is delivered and guided toward the end surfaces of the side emission type optical fibers 2 bundled from the LED light source, which causes the side emission type optical fibers 2 to emit light. When the tip parts of the plurality of side emission type optical fibers 2 are bundled, all of the side emission type optical fibers 2 woven into the skin material for vehicle interior 100 may be bundled if possible, depending on the shape and size (area) of the skin material for vehicle interior 100. A plurality of side emission type optical fiber bundles in which a predetermined number of the side emission type optical fibers 2 are bundled may be used.

The vehicle interior base 5 is usually a molded body made of a synthetic resin, and is molded into the shape of a vehicle interior material such as a door trim or a roof trim by a press-molding method in which heating and pressing are performed using a mold. The synthetic resin is not particularly limited, and polyolefin-based resins such as polyethylene and polypropylene, and polyamide-based resins such as nylon 6 and nylon 66 are used. Among these synthetic resins, polypropylene is preferable from the viewpoints of easiness to mold, strength, and the like. A fiber reinforced resin including glass fibers, carbon fibers, or the like can be used in order to improve physical properties such as rigidity.

The present invention makes it possible to provide variously modified embodiments within the scope of the present invention depending on its purpose and application. For example, the side emission type optical fibers 2 can take a form such that they do not appear on the outermost surface of the skin material for vehicle interior 100 and are woven at a deep position on the inner side, based on the woven texture, such as double-woven texture or triple-woven texture, of the woven fabric woven by using the side emission type optical fibers 2 and the multifilaments or the monofilaments, and also by adjusting the yarn density.

Furthermore, the appearance of the side emission type optical fibers 2 on the outermost surface of the vehicle interior side of the skin material for vehicle interior 100 can be prevented by setting the finenesses of the multifilaments and monofilaments and the fineness of the side emission type optical fibers 2 to the fineness ratio described above. However, when the fineness of the side emission type optical fibers 2 is small, the fiber diameter of the multifilaments is prevented from becoming smaller than the diameter of the side emission type optical fibers 2 even if the diameter of the multifilaments is reduced by tension applied during weaving. This also makes it possible to suppress the appearance of the side emission type optical fibers 2 on the outermost surface of the vehicle interior side of the skin material for vehicle interior 100. The appearance of the side emission type optical fibers 2 on the outermost surface of the skin material for vehicle interior 100 can be more efficiently prevented considering the functions and effects of the woven texture, yarn density, and fineness.

Back fixing yarns 4 can be woven into the surface of the synthetic resin fibers 1b and 1a not bonded to the side emission type optical fibers 2 by the heat fusible fibers 3 (see FIG. 5). Thus, the back fixing yarns 4 are woven, which makes it possible to prevent the synthetic resin fibers 1b and 1a from being displaced in the lateral direction, which can provide the skin material for vehicle interior 100 having a predetermined shape and size. In particular, when the synthetic resin fibers 1b and 1a are the multifilaments, they are flexible, and likely to be deformed as compared with the monofilaments, and have large fineness, whereby the back fixing yarns 4 more effectively exhibits an effect of preventing displacement.

Furthermore, as the synthetic resin fibers 1b and 1a, spun-dyed yarns and the like can be used, but synthetic resin fibers 1b and 1a having different color tones can also be woven from the viewpoint of a design property. For example, light color-based synthetic resin fibers 1b and 1a are woven into a skin material for vehicle interior 100 having a gray-based cool tone, whereby an accent is imparted to a design surface, and the light color-based synthetic resin fibers 1b and 1a make it also possible to construct a drawing pattern. The synthetic resin fibers 1b and 1a having different color tones may be of one kind or of a plurality of kinds.

It should be noted that the foregoing examples have been provided merely for the purpose of explanation and are not to be construed as limiting of the present invention. While the present invention has been described with reference to exemplary embodiments, it is understood that the words which have been used herein are words of description and illustration, rather than words of limitation. Changes may be made, within the scope of the appended claims, as described in detail herein, without departing from the scope and spirit of the present invention in its aspects. Although reference has been made herein to specific structures, materials and embodiments in the detailed description of the invention, the present invention is not intended to be limited to the particulars disclosed herein. Rather, the present invention extends to all functionally equivalent structures, methods and uses within the scope of the appended claims.

The present invention can be utilized in the technical field of a skin material for vehicle interior which is bonded to a vehicle interior base, forms a vehicle interior design surface, and can be utilized as indirect vehicle interior lighting. In particular, the present invention is useful in the technical field of a skin material for vehicle interior material such as a door trim or a roof trim.

What is claimed is:

1. A skin material for vehicle interior bonded to a resinous vehicle interior base, the skin material for vehicle interior comprising a woven fabric woven by using synthetic resin fibers, side emission type optical fibers, and heat fusible fibers as warps or wefts,
    wherein:
    a ratio ($d_S/d_f$) of fineness ($d_S$) of the synthetic resin fibers to fineness ($d_f$) of the side emission type optical fibers is from 1.5 to 7.0; and
    the synthetic resin fibers and the side emission type optical fibers adjacent to the synthetic resin fibers are bonded in respective longitudinal directions by the heat fusible fibers.

2. The skin material for vehicle interior according to claim 1, wherein:
    the synthetic resin fibers are multifilaments; and a ratio ($d_{S1}/d_f$) of fineness ($d_{S1}$) of the multifilaments to fineness ($d_f$) of the side emission type optical fibers is from 2.0 to 7.0.

3. The skin material for vehicle interior according to claim 1, wherein:
    the synthetic resin fibers are monofilaments; and a ratio ($d_{S2}/d_f$) of fineness ($d_{S2}$) of the monofilaments to fineness ($d_f$) of the side emission type optical fibers is from 1.5 to 6.0.

4. The skin material for vehicle interior according to any one of claim 1, wherein:
    a plurality of the side emission type optical fibers are woven between the synthetic resin fibers adjacent to each other; and the side emission type optical fibers adjacent to each other are bonded to each other in the longitudinal direction by the heat fusible fibers.

5. The skin material for vehicle interior according to claim 2, wherein:
    a plurality of the side emission type optical fibers are woven between the synthetic resin fibers adjacent to each other; and the side emission type optical fibers adjacent to each other are bonded to each other in the longitudinal direction by the heat fusible fibers.

6. The skin material for vehicle interior according to claim 3, wherein:
    a plurality of the side emission type optical fibers are woven between the synthetic resin fibers adjacent to each other; and the side emission type optical fibers adjacent to each other are bonded to each other in the longitudinal direction by the heat fusible fibers.

7. The skin material for vehicle interior according to claim 1, wherein
    the heat fusible fibers are obtained by twisting multifilaments and heat fusion yarns having a melting point lower than that of the multifilaments.

8. The skin material for vehicle interior according to claim 2, wherein
    the heat fusible fibers are obtained by twisting multifilaments and heat fusion yarns having a melting point lower than that of the multifilaments.

9. The skin material for vehicle interior according to claim 3, wherein
    the heat fusible fibers are obtained by twisting multifilaments and heat fusion yarns having a melting point lower than that of the multifilaments.

10. The skin material for vehicle interior according to claim 1, wherein:
    a plurality of the side emission type optical fibers are woven between the synthetic resin fibers adjacent to each other; and the side emission type optical fibers adjacent to each other are bonded to each other in the longitudinal direction by the heat fusible fibers, and wherein
    the heat fusible fibers are obtained by twisting multifilaments and heat fusion yarns having a melting point lower than that of the multifilaments.

11. The skin material for vehicle interior according to claim 1, wherein:
    the synthetic resin fibers are multifilaments; and a ratio ($d_{S1}/d_f$) of fineness ($d_{S1}$) of the multifilaments to fineness ($d_f$) of the side emission type optical fibers is from 2.0 to 7.0, wherein:
    a plurality of the side emission type optical fibers are woven between the synthetic resin fibers adjacent to each other; and the side emission type optical fibers adjacent to each other are bonded to each other in the longitudinal direction by the heat fusible fibers, and wherein
    the heat fusible fibers are obtained by twisting multifilaments and heat fusion yarns having a melting point lower than that of the multifilaments.

12. The skin material for vehicle interior according to claim 1, wherein:
    the synthetic resin fibers are monofilaments; and a ratio ($d_{S2}/d_f$) of fineness ($d_{S2}$) of the monofilaments to fineness ($d_f$) of the side emission type optical fibers is from 1.5 to 6.0, wherein:
    a plurality of the side emission type optical fibers are woven between the synthetic resin fibers adjacent to each other; and the side emission type optical fibers adjacent to each other are bonded to each other in the longitudinal direction by the heat fusible fibers, and wherein
    the heat fusible fibers are obtained by twisting multifilaments and heat fusion yarns having a melting point lower than that of the multifilaments.

13. The skin material for vehicle interior according to claim 7, wherein the multifilaments twisted with the heat fusion yarns remain as constituent yarns after the bonding.

14. The skin material for vehicle interior according to claim 8, wherein the multifilaments twisted with the heat fusion yarns remain as constituent yarns after the bonding.

15. The skin material for vehicle interior according to claim 9, wherein the multifilaments twisted with the heat fusion yarns remain as constituent yarns after the bonding.

16. The skin material for vehicle interior according to claim 10, wherein the multifilaments twisted with the heat fusion yarns remain as constituent yarns after the bonding.

17. The skin material for vehicle interior according to claim 11, wherein the multifilaments twisted with the heat fusion yarns remain as constituent yarns after the bonding.

18. The skin material for vehicle interior according to claim 12, wherein the multifilaments twisted with the heat fusion yarns remain as constituent yarns after the bonding.

\* \* \* \* \*